Figure 1:
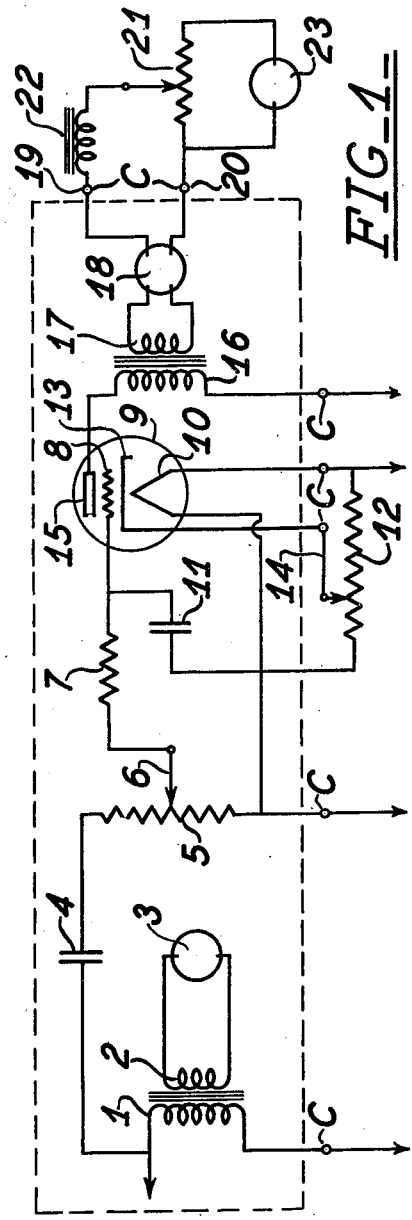

Nov. 4, 1941.                P. S. WILLIAMS                2,261,321
                        SEISMIC EXPLORATION METHOD
                          Filed June 17, 1938           2 Sheets-Sheet 1

INVENTOR.
Philip S. Williams
BY
P. L. Young
ATTORNEY.

UNITED STATES PATENT OFFICE 2,261,321

SEISMIC EXPLORATION METHOD

Philip S. Williams, Tulsa, Okla., assignor to Standard Oil Development Company, a corporation of Delaware Application June 17, 1938, Serial No. 214,374

9 Claims. (Cl. 181—0.5)

The present invention is directed to that branch of geophysical exploration which is known as reflection seismography. It is directed particularly to an improvement in the procedure and apparatus employed in this type of exploration.

Reflection seismography, as practiced in geophysical prospecting for the profiling of substrata, is typically carried out by setting off a charge of explosive at a set point, known as the shot-point, and picking up the waves emanating from the explosion, after they have been reflected by substrata, at a plurality of points usually in alignment with the shot-point and spaced from the shot-point and from each other. The reflected waves are picked up at the receiving points by seismopickups. These seismopickups are devices which are provided with means for converting mechanical vibrations into electrical impulses. Each seismopickup is connected to a suitable electrical amplifying circuit the output of which is connected to a moving coil galvanometer with a mirror attached to the coil. Conventionally, these galvanometers are arranged in a battery in such relation to a moving strip of sensitized paper and to a light source so as to record on the paper a plurality of wave forms, or "traces," the same in number as the seismopickups, which have their longitudinal axes parallel with the longitudinal axis of the strip of paper. The strip of paper is moved longitudinally at a substantially constant speed and is provided with transverse time marks so as to make possible the determination of the time of arrival of any particular point on the trace after the firing of the shot.

The use of records so produced to give information as to the subsurface structure of the earth is based on the idea that the seismic disturbance caused by the explosion will travel downwardly into the earth and be reflected back to the surface by various more or less well defined strata existing below the surface, and that the arrival at the surface of these reflected energies will be detectable on the record. The arrival time of such a disturbance can be read from the record, and from it the depths of the reflecting stratum can be computed, using data otherwise obtained on the velocity of seismic waves in the substrata.

The detection of reflected waves on the record is very often extremely difficult. The traces, as a rule, show rather continuous random disturbances, coming directly or by refraction from the shot, or created by outside disturbances such as moving objects in the vicinity and the wind, or consisting of weak and/or multiple reflections. There are two criteria for a reflection. The first is based on the direction-finding properties of the seismopickup arrangement and requires that a disturbance, to be a reflection, be visible on each of the traces in such a time sequence as to indicate that it was coming from some point below, rather than horizontally from the shot. The second, based on the fact that such a time sequence could occur accidentally, requires that a reflection must show some increase in the amplitude of the motion indicated by the traces. These two criteria are fundamentally connected in that a reflection, to show through the random disturbances, must signal the arrival of additional vibratory energy from the subsurface.

In the interpretation of the records displaying the reflected waves, the chief emphasis has been on the exact arrival time of a disturbance on the various traces. When the arrival time of a disturbance on the various traces follow a line transversely of the record which is inclined to the vertical more or less than would be expected from the spacing of the seismopickups from the shot point, and the computed velocities of seismic waves in the substrata, the record indicates that the reflecting substratum is inclined downwardly or upwardly from the shot point in the direction of the seismopickups depending upon the angle which the aforesaid transverse line makes with the horizontal. The amplitude characteristics of the reflections have received little attention except as a sort of index of quality, the better reflections, in general, being those which cause the greatest increase in amplitude.

The present invention is based on the discovery that the interpretation of a record of the aforesaid type can be facilitated by including in it, in addition to or instead of the customary traces, a line representing the average amplitudes of these traces. On this line the reflection appears as a distinct hump and so can be readily distinguished from the random disturbances that cause confusion in the conventional record. Moreover, this amplitude trace makes it easier to follow a given reflection from record to record. In addition, since the energy return from a reflecting layer must be influenced by the physical properties of the layer in relation to those of adjacent layers, a study of the amplitude trace permits inferences to be drawn concerning these properties.

More specifically, the present invention resides in recording on the record in a quantitative manner the average of the amplitudes, or a quantity dependent thereon, at each instant of the traces on a conventional seismogram with or without the simultaneous recording of the conventional traces. By average is meant the average without regard to sign and not the algebraic average which is obtained in known systems by the use of feedover or coupling arrangements between the various seismopickup systems. The recording of this average amplitude trace may, according to the present invention, be accomplished by the use of suitable means, hereinafter illustrated, arranged in the seismopickup systems or it may be produced from the conventional record, after the latter is produced in the conventional manner, by suitable electrical or mechanical, including manual, means. The advantages of the procedure constituting the present invention can be in part realized without recording a single line representing the average amplitude of a plurality of traces by revising the conventional seismopickup systems so as to produce a record on which the amplitudes of the arriving waves are recorded without regard to sign. That is to say, instead of a trace being a series of crests and troughs, which is the case in the conventional trace since seismic disturbances are oscillatory in character, the trace produced according to the present invention is an irregular line all on one side of a zero point. An apparatus suitable for producing such traces will be described hereinafter.

Figure 2:
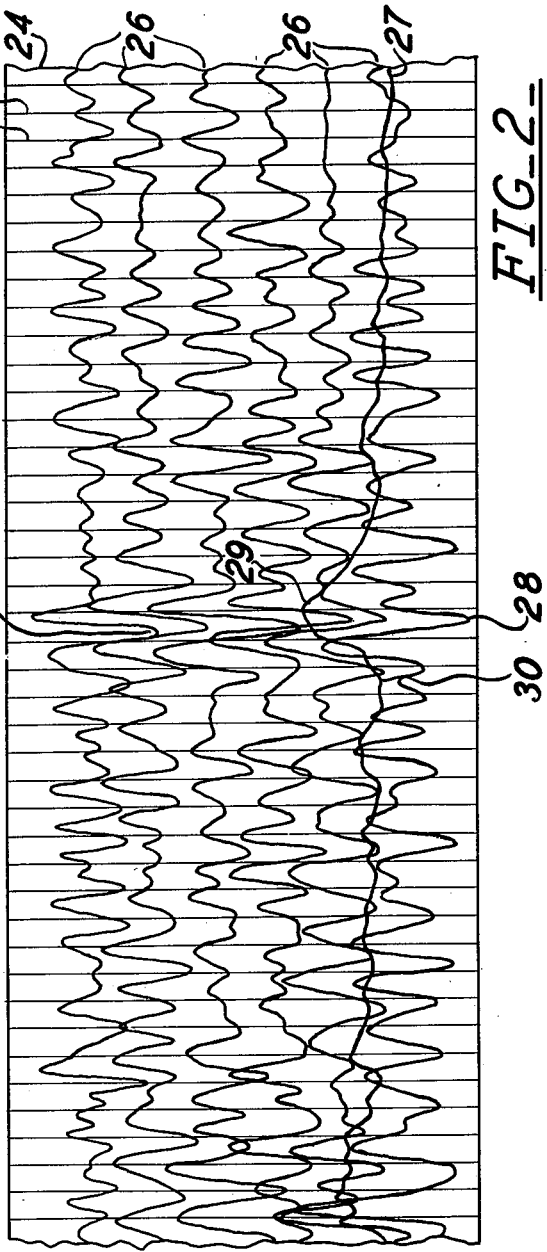
Figure 3:
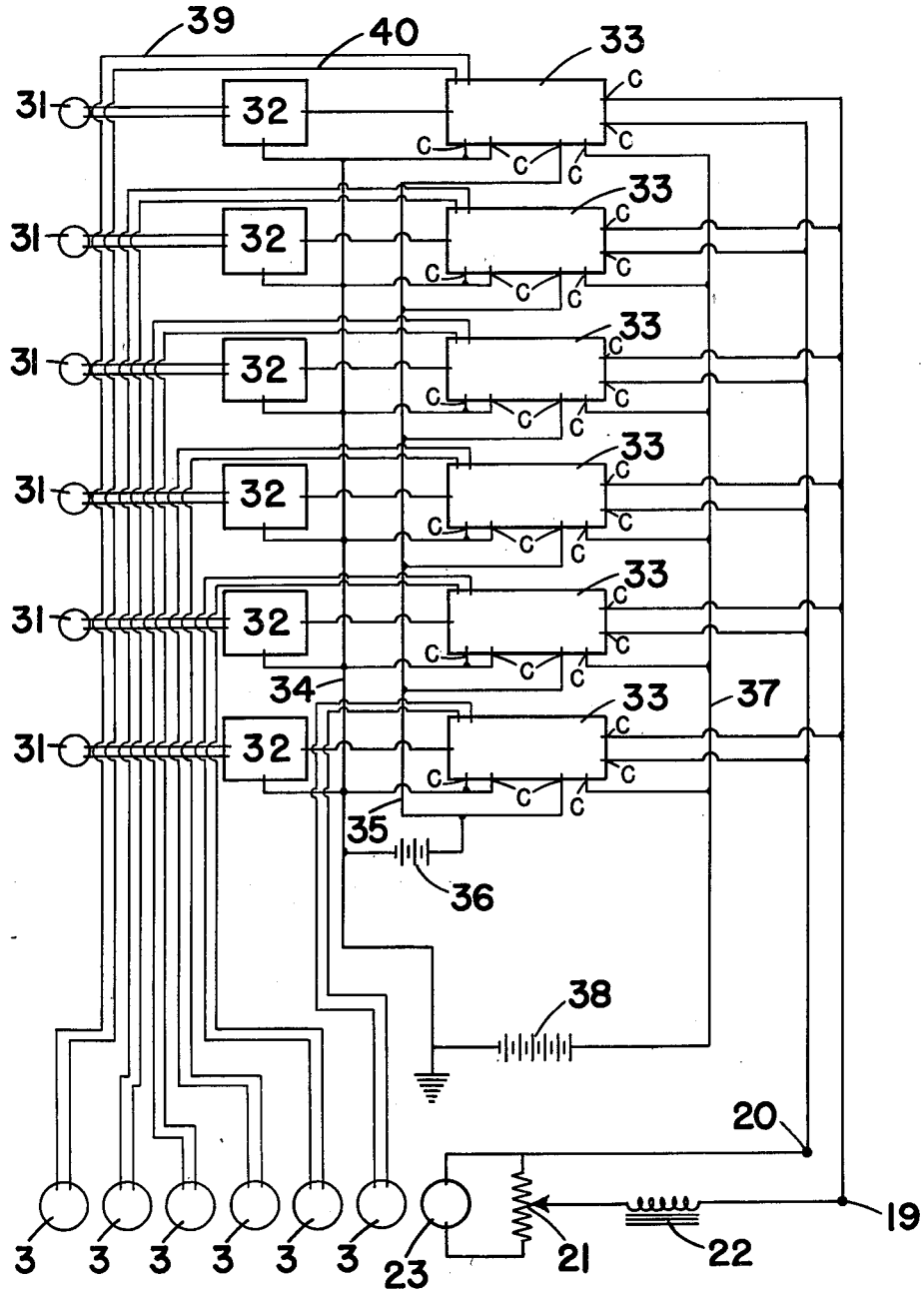

The nature and objects of the present invention will be better understood from the following detailed description of the accompanying drawings in which Figure 1 is a schematic view of one type of electrical apparatus for producing a record according to the present invention;

Figure 2 is a reproduction showing the amplitude trace in addition to the conventional traces; and Fig. 3 is a schematic illustration of an arrangement according to the present invention using six pickups.

Referring to Figure 1 in detail, numeral 1 designates the primary of a transformer to which is fed the output from an amplifier connected to a conventional seismopickup. The secondary 2 of the transformer is connected across a galvanometer 3 which is of the conventional type having a moving coil carrying a mirror which reflects the image of a line on a moving strip of sensitized paper. The recording apparatus forms no part of the present invention, and is, therefore, not shown.

Connected across the primary 1 is a circuit including a condenser 4 and a potentiometer 5. The pointer 6 of the potentiometer is connected in series through a fixed resistance 7 with the grid 8 of a vacuum tube 9. The filament 10 of the vacuum tube is connected to the low side of potentiometer 5 and to the ground. The condenser 11 is between the grid and the ground. Connected across the filament is a potentiometer 12. The usual batteries are provided for heating the filament. The vacuum tube contains a cathode 13 which is connected to the pointer 14 of potentiometer 12, and is thus biased by the filament battery. The plate 15 of the tube is connected to the primary 16 of a transformer the secondary 17 of which is connected across a rectifier 18 which may be a full wave copper oxide rectifier. The output of rectifier 18 is fed to terminals 19 and 20, which in turn are connected to a potentiometer 21 through a choke coil 22. A galvanometer 23 is connected across potentiometer 21. This galvanometer is of the same character as galvanometer 3 and in the actual apparatus is so arranged with respect to galvanometer 3 and the light source as to cast a beam on the same strip of sensitized paper as galvanometer 3. A suitable arrangement of galvanometers for this purpose is shown in Patent No. 2,149,442, issued March 7, 1939, to F. M. Kannenstine.

Each seismopickup, with amplifier, is provided with an assembly identical with that above described. These assemblies are connected together at several common points designated as C in Figure 1. These common points are either connected to a battery or to the ground. The common points 19 and 20 receive the outputs of the rectifiers of all the units. The voltage impressed across the galvanometer 23, therefore, is proportional to the mean of all the voltages impressed across the terminals 19 and 20.

The complete assembly is shown in Fig. 3 in which parts corresponding to similar parts in Fig. 1 bear the same numerals. In Fig. 3 the circuit shown in dotted lines in Fig. 1 is designated by box 33. The points indicated by C in Fig. 3 correspond to the points indicated by C in Fig. 1, reading from left to right.

Numeral 31 designates a pickup connected to amplifier 32. One outlet of the amplifier is connected to the circuit in box 33, specifically to the primary winding 1 of a transformer as shown in Fig. 1. The other outlet from amplifier 32 is connected to a ground line 34. The first two C points on the left of Fig. 1 are also connected to ground line 34. The next C point, which corresponds to the C point connected to the filament 10 of vacuum tube 9, is connected to a line 35, to which is connected this same C point of all of the units 33. Lead 35 is connected to one side of a battery 36, the other side of which is connected to ground line 34.

The next C point of each assembly, still reading from left to right, which corresponds to the C point connected to winding 16 in Fig. 1, is connected to a common line 37 which, in turn, is connected to one terminal of a battery 38, the other terminal of which is connected to ground line 34. The next two C points on each assembly, which correspond to the points in numeral 19 and 20 in Fig. 1, are all connected in common to points 19 and 20 which, in turn, are connected to the recording galvanometer 23. The leads 29 and 40 in Fig. 3 correspond to the connecting wires between winding 2 and galvanometer 3 in Fig. 1. These galvanometers are arranged in a battery in suitable relation to galvanometer 23 so that all of the galvanometers will record on the same strip of paper.

When alternating voltages of various amplitudes and frequencies, resulting from the conversion of seismic waves into electrical impulses, are impressed across a primary 1, voltages are set up in secondary 2 causing oscillation of the coil of galvanometer 3, whereby a conventional trace is made on the record. At the same time this varying voltage is impressed on the grid 8 whereby variations in the plate current of the vacuum tube are created. These variations in the plate current of the vacuum tube set up an alternating voltage in secondary 17 of the output transformer, which alternating voltage is converted in the rectifier into unidirectional pulses which are impressed across terminals 19 and 20. This unidirectional voltage impressed across terminals 19 and 20 will be at all times proportional to the amplitude of this varying voltage supplied to the primary 1 and to the resulting deflections of galvanometer 3, for a particular frequency of alternating voltage. In the embodiment of the invention under description, the components 4, 5, 7 and 11 are so chosen that with changes in frequency the above proportionality is maintained relative to the deflections of galvanometer 3, although not necessarily to the voltage on primary 1. It will be understood that the condenser 4 is necessary in the first place to prevent the flow of direct current from the seismopickup circuit to the grid 8, and is selected to have a low alternating current impedance relative to the potentiometer 5.

Since the amplitude measuring circuits of all the seismopickup lines are connected in parallel across terminals 19 and 20, the current measured by galvanometer 23 will be proportional to the average amplitude without regard to sign of the traces of the galvanometer 3. Any desired ratio of the deflection of galvanometer 23, which will always be unidirectional, to the deflection of a galvanometer 3 can be secured by the proper setting of potentiometer 5. For galvanometer 23 to indicate accurately the average amplitude of the traces of the galvanometers 3 this ratio should be made the same for all the amplitude measuring units.

The sensitivity of galvanometer 23 is controlled by potentiometer 21. The choke coil 22 is provided to smooth out the average amplitude trace by eliminating therefrom high frequency ripples.

Referring to Figures 2, numeral 24 designates a strip of sensitized paper provided with time lines 25. The record portrayed was produced by the use of six seismopickups, and, therefore, has six traces 26. The average amplitude trace is designated by numeral 27. In this instance, the zero deflection of the galvanometer 23 was set to coincide with the bottom edge of the record. The reflected wave on the record is shown by troughs 28. The reflected wave on the average amplitude trace is indicated by a hump bearing numeral 29. It can be seen that there is a very definite point 30 on the average amplitude trace at which the received energy begins its upward trend toward the peak of hump 29.

The trough 28 would probably be picked for the arrival time of the reflection in the regular method of computation of the record, since it is so strongly marked. However, it is evident from the record that reflected energy is arriving both before and after this trough; and this is indicated also by the width of the hump 29 on the amplitude line. If the line of troughs 28 had followed a line across the record which was considerably inclined from the vertical, due to sloping substrata, the hump 29 would have been wider and not quite as high.

Earlier in the specification it was pointed out that instead of producing a record having the conventional traces shown in Figure 2, it is possible, according to the present invention, to produce a record having traces which are indicative of the amplitudes of the arriving waves at the seismopickups, regardless of sign. Such a record may be readily produced by omitting galvanometer 3 and by having only a single seismopickup affecting terminals 19 and 20, whereby galvanometer 23 will reflect only the amplitudes of the waves arriving at the seismopickup to which it is connected. Thus, in this arrangement there will be a separate galvanometer 23 for each seismopickup, and each seismopickup will be connected to its own individual terminals 19 and 20.

It is apparent that many changes may be made in the above described arrangement without departing from the essence of the present invention which is the conception of producing a record on which the amplitude of waves arriving at a seismopickup and modified by the amplifiers are recorded without regard to sign, or on which the average amplitude of waves arriving at a plurality of seismopickups is recorded without regard to sign. Accordingly, the present invention is in no way restricted to the use of any specific apparatus but has a scope indicated by the appended claims which are intended to be as broad as the prior art permits.

I claim:

1. In the geophysical exploration of earth substrata, the steps of creating a seismic disturbance at a selected point in the earth whereby seismic waves are caused to travel through the substrata, receiving said waves at a plurality of points spaced from each other and from the point of creation and recording, as a single trace the average amplitude without regard to sign of the received waves.

2. In the geophysical exploration of earth substrata, the steps of creating a seismic disturbance at a selected point in the earth whereby seismic waves are caused to travel through the substrata, receiving said waves at a plurality of points spaced from each other and from the point of creation, converting said waves at said reception points into unidirectional electrical impulses, combining said impulses and recording the result of the combination.

3. In the geophysical exploration of earth substrata, the steps of creating a seismic disturbance at a selected point in the earth whereby seismic waves are caused to travel through the substrata, receiving said waves at a plurality of points spaced from each other and from the point of creation, converting said waves at said reception points into electrical oscillations, simultaneously converting said waves at said reception points into unidirectional electrical impulses and simultaneously and separately recording said oscillations and said unidirectional impulses on a single record.

4. In the geophysical exploration of earth substrata, the steps of creating a seismic disturbance at a selected point in the earth whereby seismic waves are caused to travel through the substrata, receiving said waves at a plurality of points spaced from each other and from the point of creation, converting said waves at said reception points into electrical oscillations, simultaneously converting said waves at said reception points into unidirectional electrical impulses, averaging said electrical impulses and simultaneously and separately recording said oscillations and the average of said impulses on a single record.

5. In seismic apparatus for conducting seismic exploration including a plurality of seismopickups, each having a corresponding amplifier for converting seismic waves into electrical oscillations, in combination, means for recording an oscillating voltage characteristic of said oscillations, means for converting said oscillations into unidirectional impulses and means for recording said unidirectional impulses simultaneously with said oscillating voltage.

6. An apparatus, according to claim 5, including means for establishing a ratio between the amplitudes of said unidirectional impulses and the amplitudes of said oscillating voltage and maintaining said ratio irrespective of changes in frequency of said electrical oscillations.

7. An apparatus, according to claim 5, in which means are provided for averaging the unidirectional impulses derived from the oscillations produced by the several seismopickups and for recording the average of said impulses simultaneously with the oscillating voltages derived from the several pickups.

8. In an apparatus for seismic exploration, including a seismopickup for converting seismic waves into electrical oscillations and an amplifier for said oscillations having a transformer output, in combination, a galvanometer connected across the secondary of said transformer output, a lead connecting the primary of said transformer output to the ground through a condenser and a potentiometer, a vacuum tube having a plate, a grid, a cathode and a filament, means for connecting said grid and filament across said potentiometer, a resistance between said potentiometer and said grid, a condenser and a second potentiometer arranged in series between said grid and the ground, means for connecting said cathode to said second potentiometer, a transformer having its primary arranged between said plate and the ground, a rectifier arranged across the secondary of said transformer, a third potentiometer connected to the output of said rectifier and a galvanometer connected across said third potentiometer.

9. In seismic apparatus for conducting seismic exploration including a plurality of seismopickups, each having a corresponding amplifier, for converting seismic waves into electrical oscillations, in combination, means for converting said oscillations into unidirectional impulses, means for combining the unidirectional impulses from the various oscillations in such a way as to average them and means for recording the average of said unidirectional impulses.

PHILIP S. WILLIAMS.